Dec. 22, 1953 P. H. SOMMERS 2,663,182
MEANS TO FACILITATE THE LAYING OF MASONRY UNITS
Filed Jan. 31, 1950 8 Sheets-Sheet 1
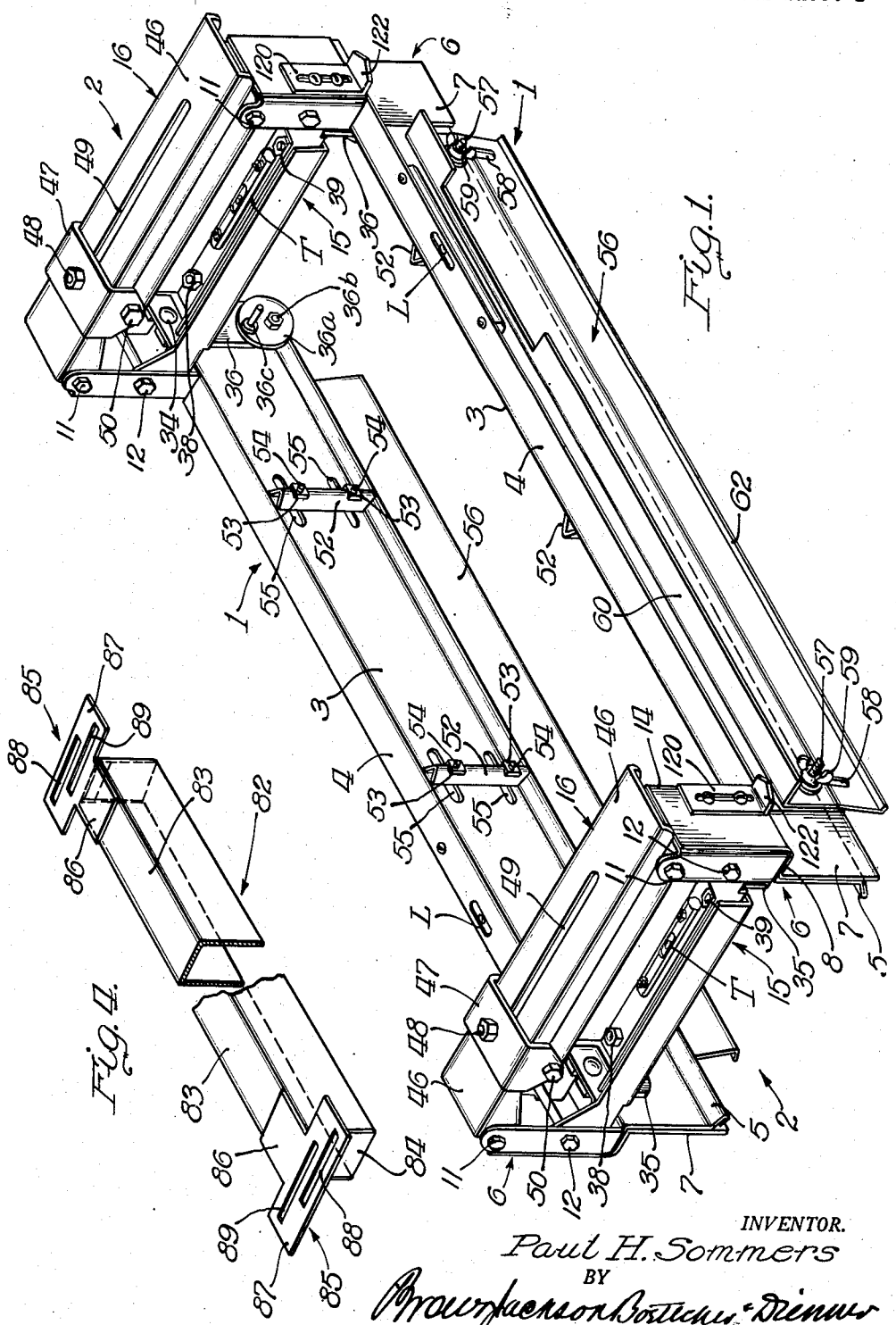
INVENTOR.
Paul H. Sommers
BY
*Brown Jackson Boettcher & Dienner*
Attys.

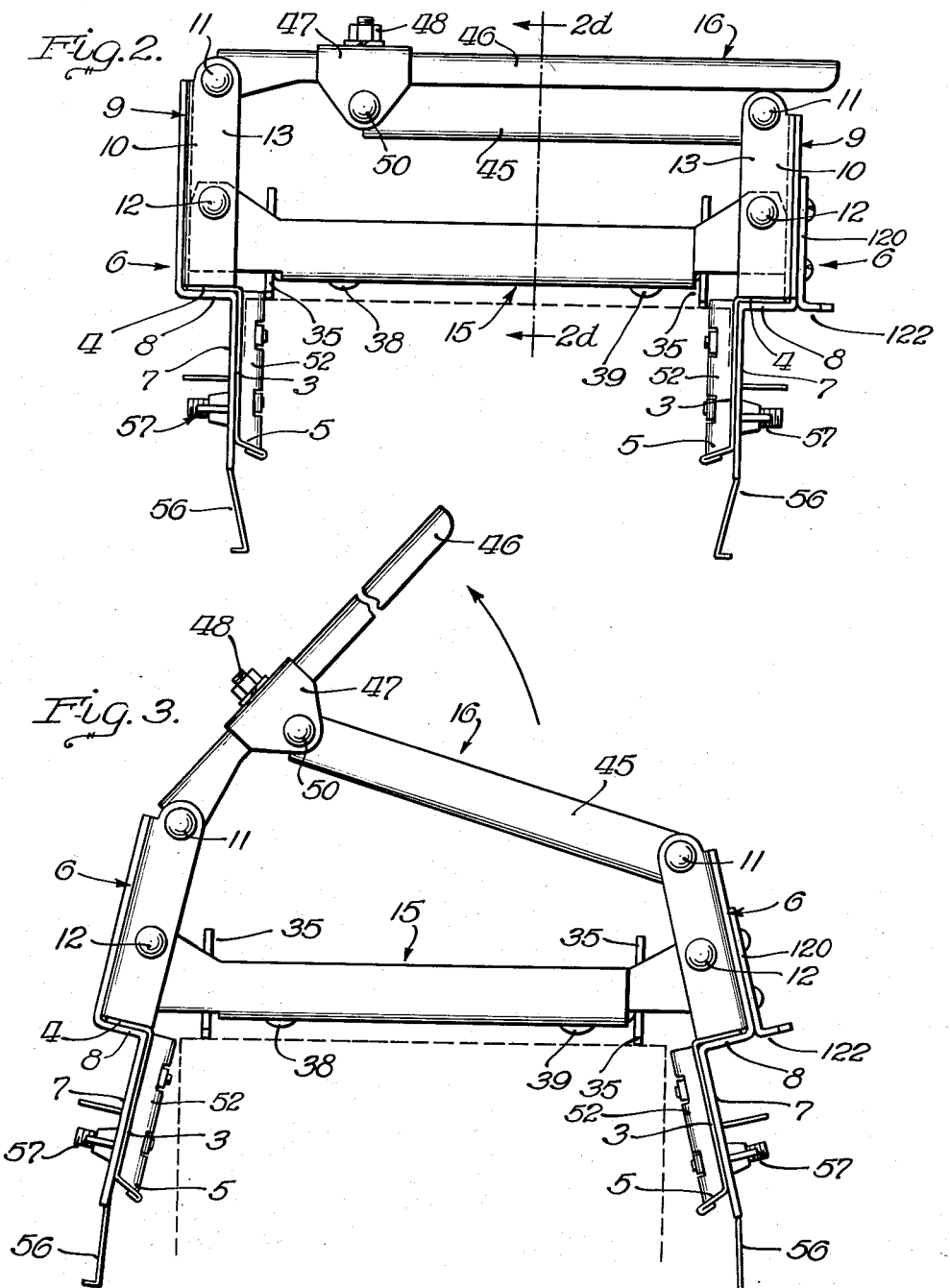

Dec. 22, 1953   P. H. SOMMERS   2,663,182
MEANS TO FACILITATE THE LAYING OF MASONRY UNITS
Filed Jan. 31, 1950   8 Sheets-Sheet 3
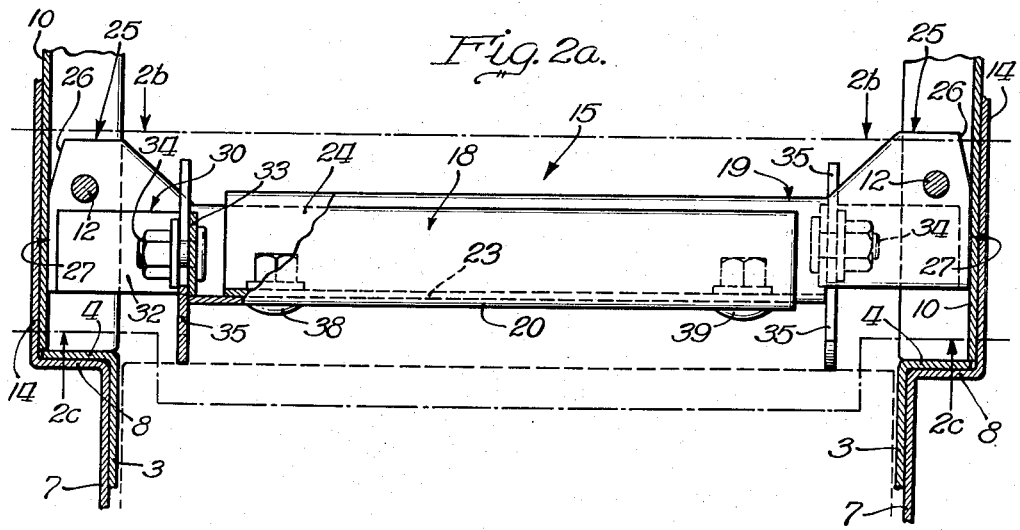
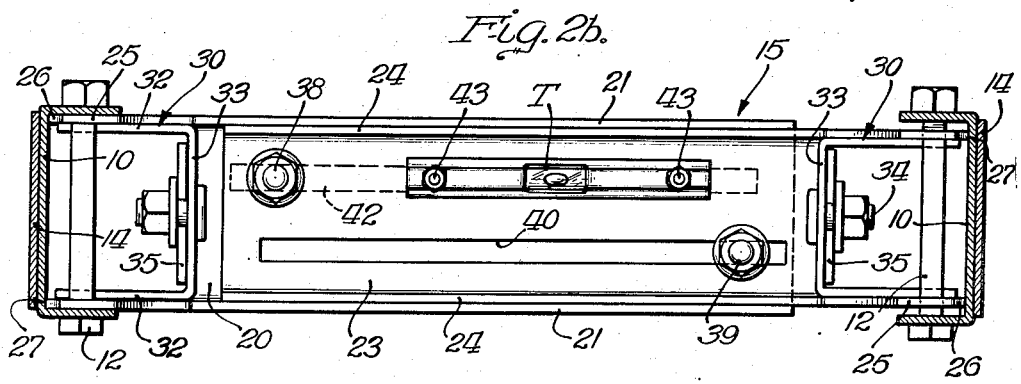
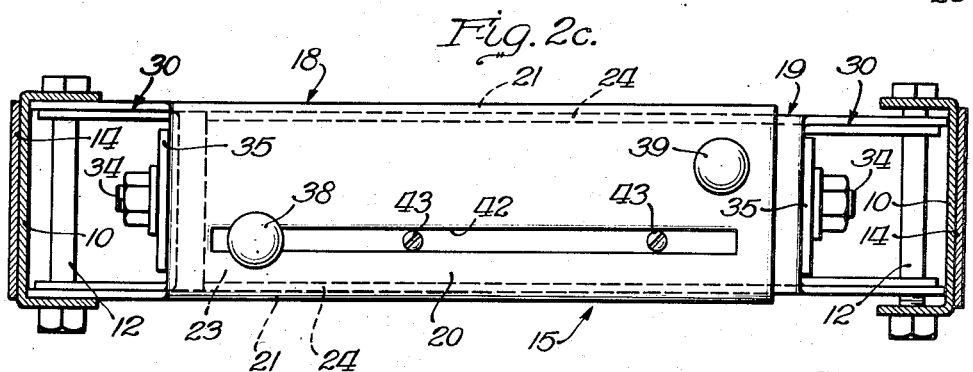
INVENTOR.
Paul H. Sommers
BY

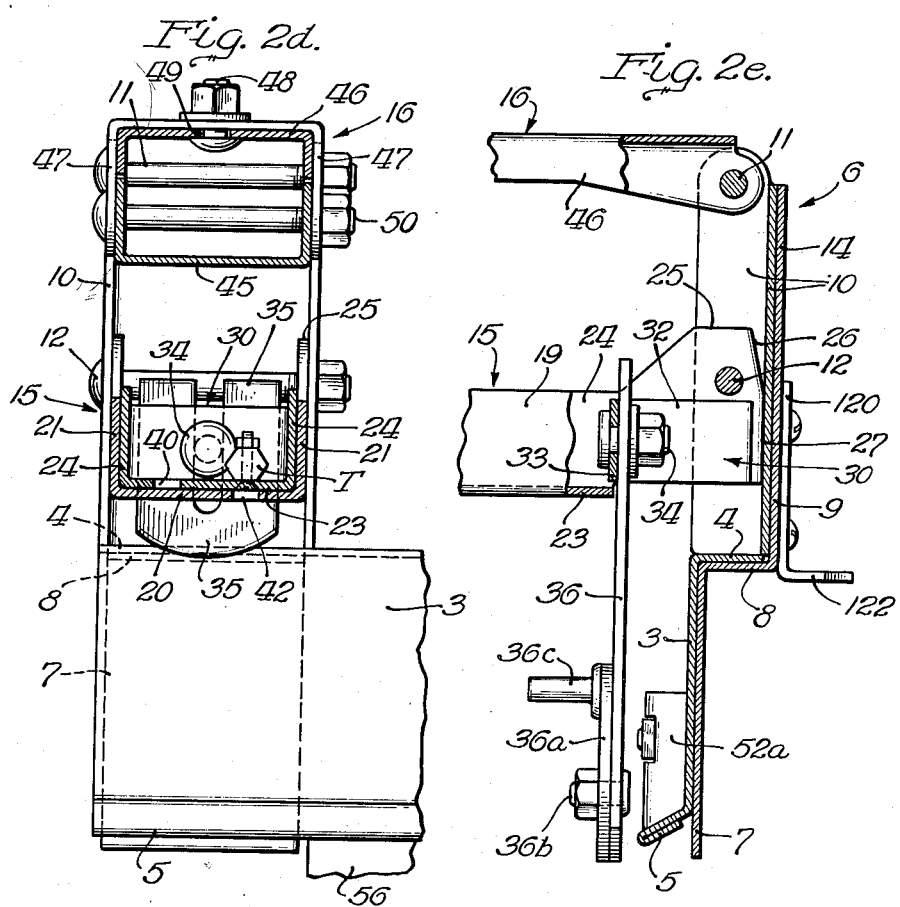

Dec. 22, 1953 P. H. SOMMERS 2,663,182
MEANS TO FACILITATE THE LAYING OF MASONRY UNITS
Filed Jan. 31, 1950 8 Sheets-Sheet 5

INVENTOR.
Paul H. Sommers
BY

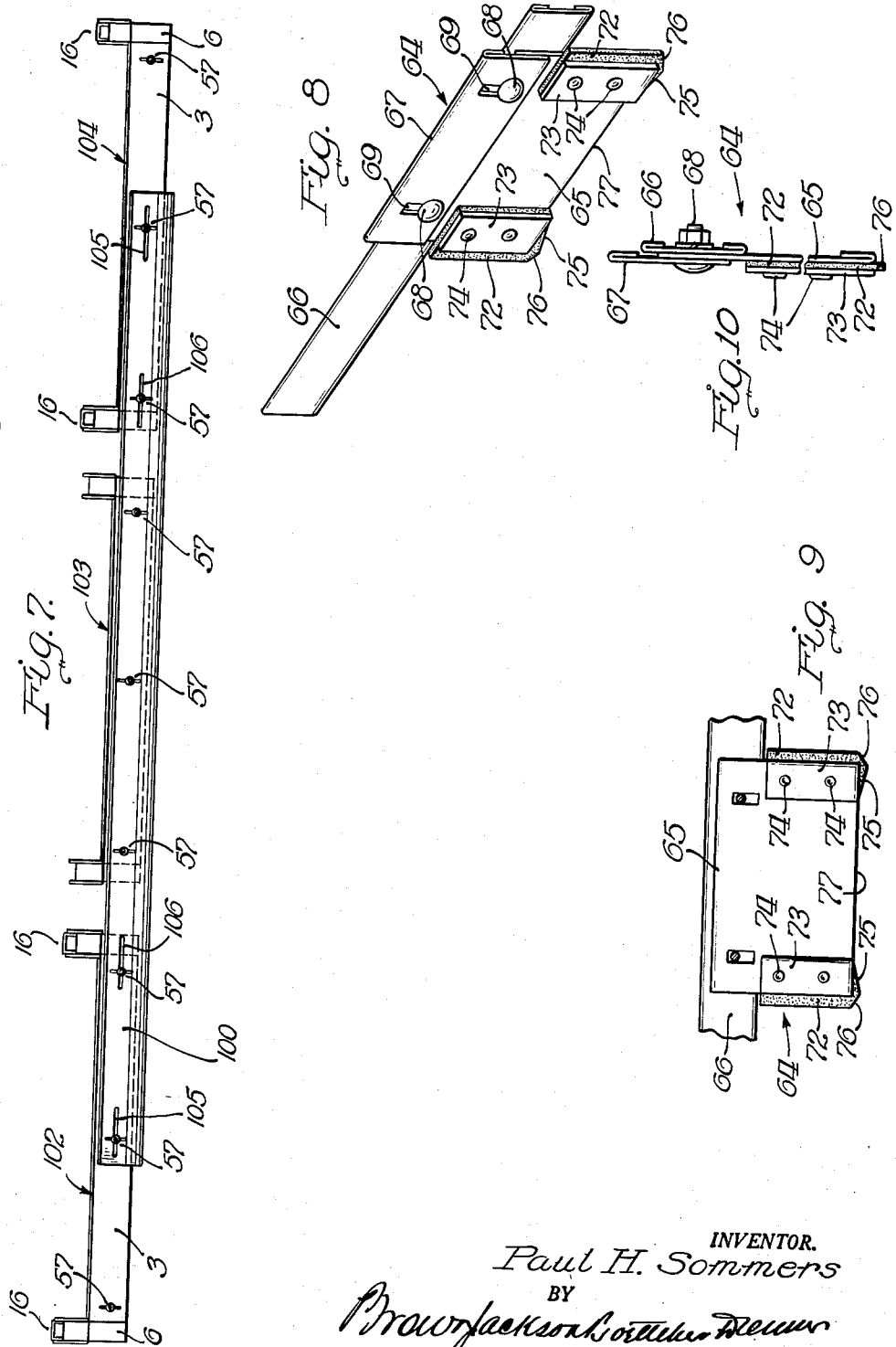

Dec. 22, 1953 P. H. SOMMERS 2,663,182
MEANS TO FACILITATE THE LAYING OF MASONRY UNITS
Filed Jan. 31, 1950 8 Sheets-Sheet 7
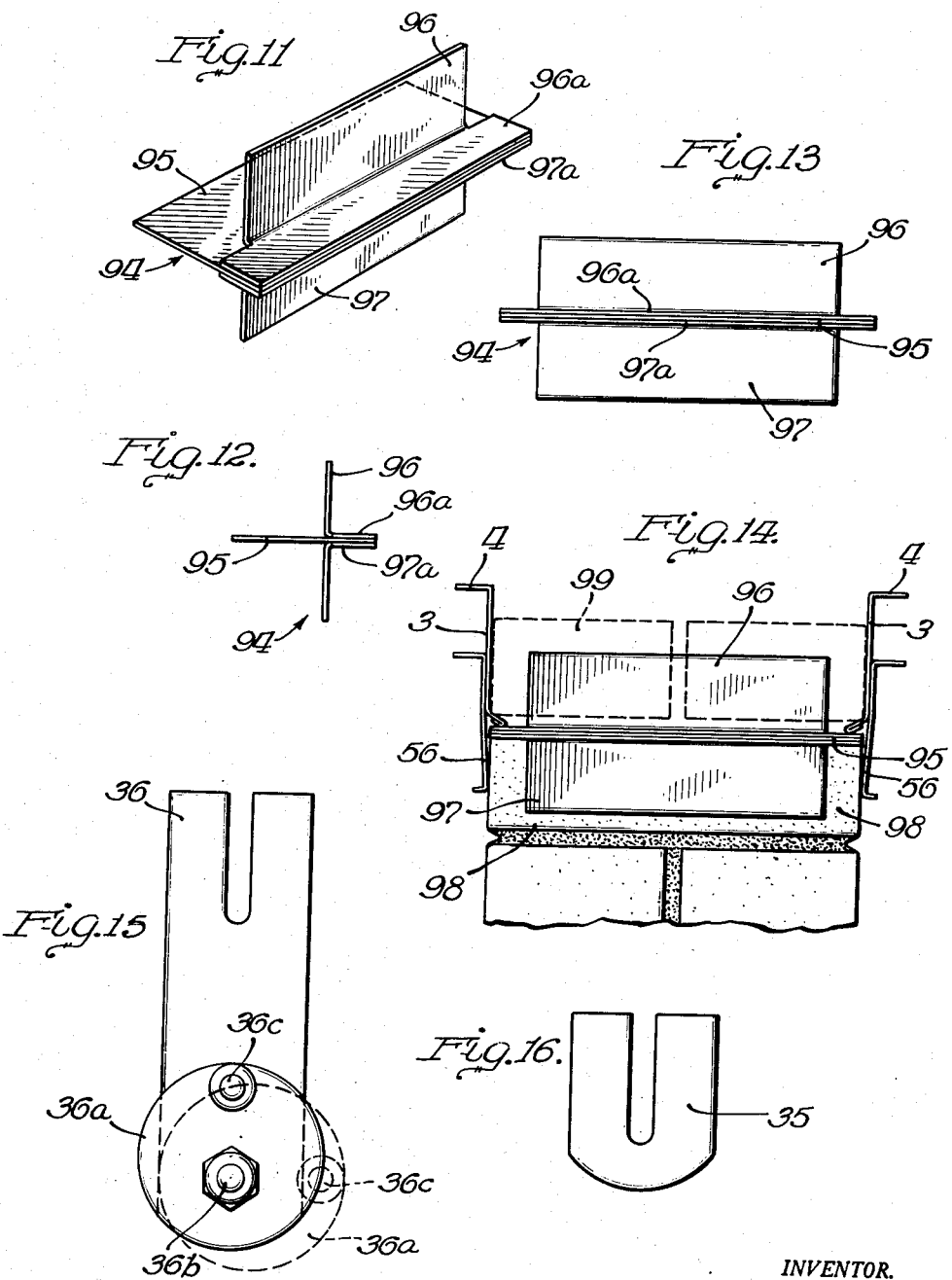
INVENTOR.
Paul H. Sommers
BY
Attys.

Dec. 22, 1953   P. H. SOMMERS   2,663,182
MEANS TO FACILITATE THE LAYING OF MASONRY UNITS
Filed Jan. 31, 1950   8 Sheets-Sheet 8
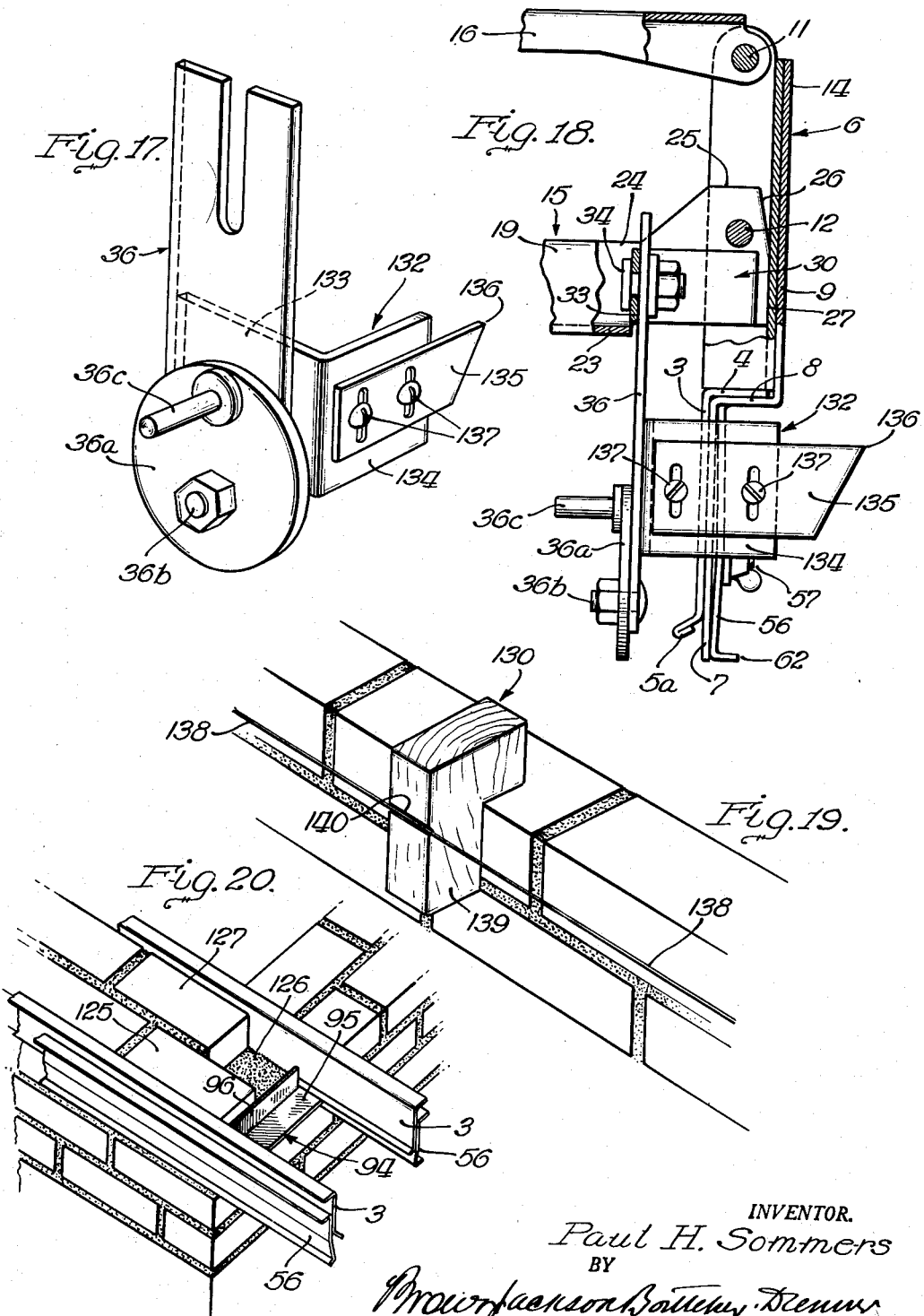
INVENTOR.
Paul H. Sommers
BY Patented Dec. 22, 1953

2,663,182

UNITED STATES PATENT OFFICE 2,663,182

MEANS TO FACILITATE THE LAYING OF MASONRY UNITS

Paul H. Sommers, Montgomery, Ala.

Application January 31, 1950, Serial No. 141,453

21 Claims. (Cl. 72—129)

1

The present invention relates to devices for facilitating the laying of masonry units, and is particularly concerned with improvements upon the inventions disclosed in my prior applications, Serial Numbers 93,078, now Patent No. 2,585,283, 95,126, filed May 24, 1949, and 103,865, filed July 9, 1949.

The chief object of the present invention is to improve the mechanical organization of the masonry unit laying device to embody a number of advantages. Among these are reduction in weight, simplification of structure, reduction in cost, greater and more easily maintained accuracy, greater facility and range of adjustment for producing various thicknesses and types of wall and for applicability to various sizes of units in the wall or other structure to be erected and greater ease of handling and manipulating the device and its accessories.

Another object of the invention is to improve the technique of laying masonry units in conjunction with the use of the guide device of my invention. This is achieved through several factors, including, first, adaptation of the structure of the guide device itself to such improved technique, and, second, by associating with the main guide device certain ancillary devices, such as the striker plate, the corner guide, the scoop, the scoop trowel, and the joint finisher, all of which supply certain guidances or perform accessory operations which relieve the operator of the requirement of having and exercising certain skills.

A specific object is to reorganize the reach, toggle and rest combination at each end of the device to make the same readily adjustable for different sizes of masonry units to be laid, and for different wall thicknesses. An ancillary object is to make the vertical beads adjustable on the guide plates for different sizes of units. A further ancillary object is to control the displacement of mortar effected by the vertical and by the horizontal beads.

A further specific object is to improve the structure of the reach to provide definite stops for stopping the plate bearing arms in definite positions and angular relations in both open and closed positions with minimum interference from extraneous matter.

A further specific object is to reorganize the plate and arm construction in the interest of simplicity and ease of manufacture, lightness and strength. A further general object is the development and coordination of the aforesaid accessory devices with the main laying guide device.

Other and further objects will appear from the

2 following specification and the accompanying drawings, in which I have described and illustrated the preferred embodiment of my invention. The preferred embodiment is described in connection with the laying of bricks as masonry units. This is not intended as limiting, but as illustrative. The scope of the invention may be determined by reference to the appended claims.

Now in order to acquaint those skilled in the art with the manner of constructing and operating a device embodying my invention, I shall describe, in conjunction with the accompanying drawings, in which like reference characters indicate like parts, the preferred embodiment of the invention.

In the drawings:

Figure 1 is an isometric view of the preferred embodiment of my invention with the device adjusted for an 8" wall, the main plates closed, and the slip plates lowered as they would be used after the wall is started. The rear end is to the left, and the forward end is to the right in this figure;

Figure 2 is an end view, taken from the left or rear end of the device shown in Figure 1;

Figures 2a to 2e are detail fragmentary views of the structure of the reach, toggle and plate arms;

Figure 3 is an end view from the left of Figure 1 showing the plates in open position;

Figure 4 is an isometric view of the central filler block for making a hollow wall;

Figure 7 is a side elevational view of a multiple plate device of my invention for laying in one setting of the device an extended part of a course of bricks such as would be required in covering an opening such as a door opening;

Figure 8 is an isometric view of the striker plate;

Figure 9 is a fragmentary front elevation of the same;

Figure 10 is an end view of the same;

Figure 11 is an isometric view of the end or corner square;

Figure 12 is an end elevation of the same;

Figure 13 is a side elevation of the same;

Figure 14 is an illustration of the mode of use of the corner square;

Figure 15 is a front elevational view of the forward rest with its adjustable cam;

Fig. 16 is a front elevational view of the rear rest;

Figure 17 is an isometric view of the adjustable leveling knife with string gauge;

Figure 18 is a cross sectional view similar to Figure 2a showing the string gauge as applied to the leveling knife. This figure also illustrates a modification wherein the vertical beads are omitted, and the horizontal bead has been cut to one-half of its normal width;

Figure 19 is an isometric view of the manner of supporting the mason's string for use with the string gauge; and Figure 20 is an isometric view of the manner of using the corner square with the guide device for laying the bricks in the corner of a wall.

Figures 5, 6:
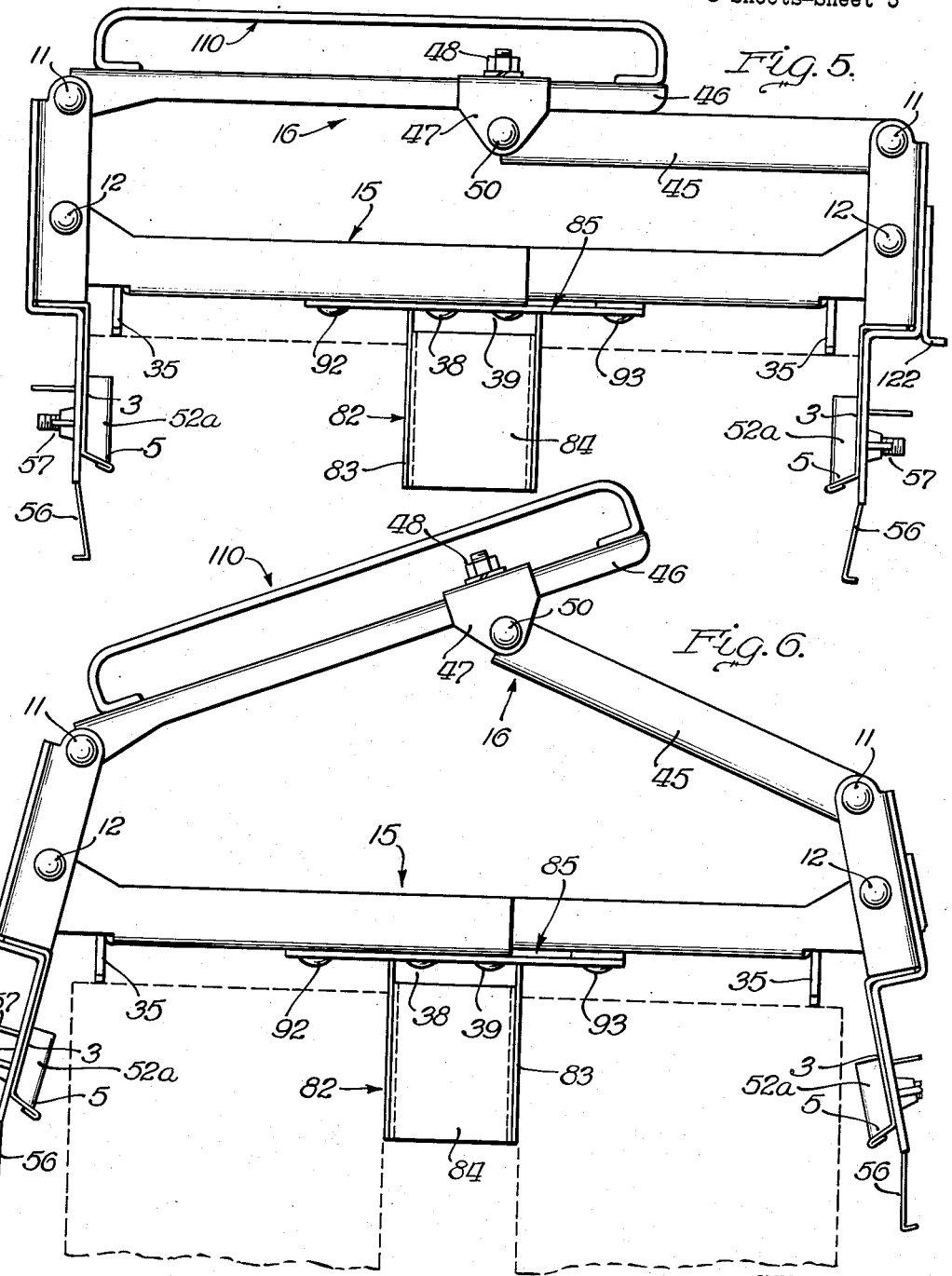
Figure 5 is an end view of the device of Figure 1 with operating handle attached, taken from the left or rear end of Figure 1, with the filler block in position, and the device adjusted for a hollow wall with a brick width on either side of the filler block, the plates being shown in closed position.
Figure 6 is a view similar to Figure 5 showing the device in open position.

Viewed generally, the device of Figure 1 comprises two side members 1, 1 running lengthwise of the wall to be laid connected at their ends by two cross members 2, 2 running across the wall to be laid. The side members 1, 1 each consist of a brick plate or guide plate 3 having its inner face adapted to be engaged by the outer faces of the units, such as bricks in the course of laying the wall, with an outwardly extending horizontal flange 4 at the upper edge and an inwardly and diagonally downwardly extending bead flange 5 at the lower edge. Plate operating arms designated generally at 6, 6 are connected to the opposite ends of each plate 3. An arm 6, see Figures 2 and 2e, comprises the lower flat portion 7 which rests against the outside face of the main body of the plate 3, an intermediate portion 8 which underlies the flange 4, and an upper portion 9, which is connected to the web or back of an inwardly facing channel shaped stamping 10, the flanges 13—13 of which carry the pivot pins 11 and 12. The upper portion 9 of the plate arm 6 is made up of an upwardly extending strap portion of the same width as the lower and intermediate portions thereof with the channel shaped stamping 10 attached thereto as by welding, or alternatively, the upper end 9 of the lever may comprise a back portion and integral side flanges or wings, such as 13—13 through which the hinge pins 11 and 12 extend. The hinge pins 11 and 12 are mounted in holes in the flanges 13—13 of the channel shaped stamping 10, the web of which is laid flat against the upper portion 14 of the arm 6 and welded thereto. The lower end of the channel shaped fitting 10 is welded to the top of the flange 4 of the main plate 3, and the intermediate portion 8 of the arm 6 is welded to the bottom of the said flange 4, and the bottom portion of the arm is welded flat against the outside of the main body of the plate 3. Preferably, the outer end of the flange 4 is notched away at the end to inlet the arm relative to the outer edge of said flange 4. The lower end 7 of each plate arm 6 extends down below the flange 5 at each corner of the device, and forms an aligning lug. When these lugs 7, which extend slightly below the flanges 5, rest upon a level surface, the device itself is level and the spirit levels L and T which are mounted longitudinally on one of the side plates and transversely on one of the cross members, respectively, are initially set to read level when the device is in that position.

The transverse members 2 at each end hold the plates parallel to each other and in vertical position relative to the said transverse members when the latter are horizontal with the plates in closed position. These cross members 2 comprise two main parts, namely, a reach 15, pivoted to the plate arms 6, 6 by the hinge pins 12, 12, and the toggle 16 connected to the said arms 6, 6 by the hinge pins 11, 11. Preferably the spacing between pins 11 and 12 on one side is greater than that on the other side to bring both arms of the toggle 16 to substantially horizontal position for all adjustments of the effective length of the toggle. Both the reach 15 and the toggle 16 are adjustable as to length, so as to maintain the desired working relation of the side members 1, 1 with respect to the wall to be constructed for various widths of wall. In the preferred form of the device, the minimum spacing between plates 3—3 is about 7½ inches to utilize brick of a size of 7½ x 3½ x 2³⁄₁₆ inches. Since bricks of approximately 8 inches in length are most generally used in the United States, it is customary to speak of a wall, where there are two rows of brick with the bricks of each row laid lengthwise side by side in a course, as an 8 inch wall.

The reach and toggle construction is shown in detail in Figures 2a to 2e. The reach 15 comprises two generally channel shaped members nested together and slidable longitudinally relative to each other and adapted to be clamped together at any desired adjusted position. The outer channel shaped member 18 and the inner channel shaped member 19 are substantially alike, save for a difference in width, so that they may nest with each other. The member 18 has a bottom web 20 and side flanges 21, 21. The inner member 19 similarly has a bottom web member 23 and side flanges 24, 24. The webs 20 and 23 stop short of the outer ends of the members 18 and 19, and the flanges continue with a greater vertical width to form the heads 25, 25 which heads are extensions of the said parallel flanges. The outer edges of these head flanges have two stop surfaces, namely, 26 and 27, for engaging the inner surfaces of the web of the channel 10 of the plate actuating levers 6, 6 in open and in closed position, respectively. When the toggle 15 thrusts the upper ends of the arms 6, 6 to their extreme outer position, each arm 6 is stopped in vertical position by engagement of the inside of channel member 10, with the surfaces 27, 27 on the corresponding heads 25 of the reach member 15. When the toggle is broken and the plates opened as shown in Figure 3, the levers 6, 6 are stopped by engagement of the inner surfaces of the channel members 10 against the stop surfaces 26 on the heads 25, 25 to determine positively the open position of the plates. A rectangular bracket member 30 having parallel arms 32, 32 and an integral web or bottom 33 is disposed between the extended flanges 21 and 24 at the outer ends of the members 18 and 19. The arms 32, 32 are disposed flat against the insides of the extended flange members 21 and 24 and spot welded thereto in the position shown in Figure 2b. The web 33 is disposed in a vertical plane transverse to webs 21 and 24 and has a bolt 34 extending through it for adjustably clamping the flat vertical shank of a rest member 35, the upper end of which is slotted to receive the bolt 34 and permit adjustment of the level of the lower end of the said rest member 35. In Figures 2a, 2b and 2c, the rest member 35 has a rounded lower end to permit it to be slid forward over the bricks just laid as the device is advanced to the right in Figure 1. At the opposite end of the device, the reach is provided with a pair of extended rest members 36, which are sometimes designated as leveling knives, since their lower ends cut down through the mortar bed to the solid surface of the bricks or other support beneath the same at the forward end of the device. The rounded end or foot of the rest member 35 at the rear of the machine is adapted to rest upon the bricks previously laid in the course under construction, whereas the rest 36 is adapted to reach down and engage bricks of the previously completed course, that is, a distance below the bottom of the rest 35 equal to the vertical thickness of a brick and the mortar joint beneath the same.

Each rest 36 is preferably provided with an adjusting eccentric or cam 36a to permit leveling of the corresponding corner of the machine as may be required in case of low spots or thin bricks or other deviations from normal. The rests 35 are generally not provided with such adjusting cams, but may if so desired. The cam or eccentric 36a is mounted on the bolt 36b near the lower end of the rest 36, and a pin 36c is provided to permit convenient turning of the eccentric to extend the length of the rest 36. A spring friction washer may be provided on bolt 36b to hold the cam in any adjusted position.

The two nested reach members 18 and 19 are held in adjusted positions by the bolts 38, 39, which project through the offset slots 40 and 42 in the inner and outer members, respectively. The slots 40, 42 are disposed at opposite sides of the longitudinal axis of the reach members, so that they are out of register with each other. The bolts 38, 39 are held in holes in their respective reach members, and they pass through these slots, and adjustment is thereby permitted by loosening the nuts on the bolts and sliding the two channel shaped members relative to each other, and then tightening up the bolts. The spirit level T is bolted to the inside face of the inner channel shaped member 19 by bolts 43, 43, which are accessible through the slot 42 in the outer member 18.

The toggle members 16, 16 comprise the shorter arm 45, and the longer or lever arm 46. These members 45, 46 are channel shaped in section, as will appear from Figure 2d, the hollow faces of the channels being presented to each other, so that when the hand of the operator presses the lever member down towards the link member 45, the rounded corners of the channels are presented to the hand. The link 45 is pivoted on the bolt 11 to the one plate arm 6, and the lever member 46 is pivoted by a similar bolt 11 to the other plate arm 6. A saddle shaped bracket 47 embraces the top and sides of the lever member 46 and is bolted thereto by means of a bolt 48 which extends through a slot 49 formed in the web of the channel shaped lever 46. The adjustable bracket member 47 has depending side arms extending below the flanges of the said channel shaped lever member 46, and said arms are provided with transversely registered holes for receiving the hinge pin 50 pivotally connecting the two toggle arms together.

As shown in Figure 3, when the lever 46 is swung upwardly as in breaking the toggle, the link 45 moves with the pin 50, and as a result, the upper ends of the plate arms 6, 6 swing toward each other on the pivots provided by the bolts 12, 12; and the plates 3, 3 and their connected parts move away from each other. The plate arms 6, 6, as previously explained, are stopped in definite position by the end faces 26 of the heads 25, 25 of the reaches 15, 15. When the toggle lever 46 is swung down carrying the link 45 with it, the upper ends of the levers 6, 6 are spread, and the plates 3, 3 swung together into the position shown in Figures 1 and 2, and the arms 6, 6 are stopped in definite position by engagement of the surfaces 27, 27 on the heads 25, 25 against the insides of the channel members 10 which are carried by or constitute a part of the plate lever 6.

It is to be observed that these stop surfaces are formed by the outer edges of the flange members of the channel shaped reach members 18, 19, and they are not as subject to being blocked by the presence of mortar or other extraneous material as would be the case in the event of two flat surfaces coming together, and from between which such mortar could not be squeezed out. These narrow stop edges, such as 26 and 27 will cut through any mortar and the like and home against the metal surface of the member 10. Similarly, the hinge pins and their cooperating hinge parts will not readily rust together or be bound together by mortar or foreign matter, since the bearings are relatively short axially of the pins, and there is no opportunity for binding to occur as would be the case in extended tubular sleeves embracing the bolts.

It is to be noted, as shown in Figures 1 and 2, that when the toggle lever 46 is pressed down against the toggle link 45, the hinge pin 50 between them is carried below the line of the pivot pins 11, 11. In other words, the pin 50 is then over center and the toggle is locked in extended position. The plate arms 6, 6 are of substantially identical construction. However, the distance between the pins 11, 12 on the side of the lever 46 of the toggle is greater than the corresponding distance on the side of the toggle arm 45, so that when the toggle is closed, the lever 46 and arm 45 are substantially horizontal.

In the embodiment shown in Figures 1 and 2, the length of the side plates 3, 3 may be, for example, 26½" long, so as to overlap the length of two and one-half 8½" bricks and two ½" joints and leave 2" at each end for the location of the leveling rests and knives 35 and 36, respectively. The device may be made in any suitable length, taking into account the number of bricks to be guided into place at one setting and taking into account the convenience of handling by one man, or by two men, if that is desired. Vertical bead members 52, 52 which may have their upper edges flush with the top flanges 4, or may extend only about half way up the plates 3, 3, and resting at their lower ends upon the diagonal flanges 5, are adjustably clamped to the inside faces of the said plates 3, 3. The bead members are preferably formed of sheet metal stampings, V-shaped in cross section, having notches to receive the square nuts 53, 53 of bolts 54, 54, the said bolts having thin slotted heads lying on the outside of the plate, the shanks thereof extending through slots 55, 55. By loosening the screws 54, 54, the bead members 52, 52 may be adjusted for distance between them and for distance from the ends of the plate. This is to accommodate the device to different brick lengths. The bead members 52 occupy preferably approximately one-half inch in a longitudinal direction, that is, they space the brick ends apart by approximately one-half inch. These vertical beads are helpful to the unskilled operator. The skilled operator generally omits them altogether. He may retain one or two at the rear end of the machine. Such remaining beads 52 or 52a may serve to locate the plates 3 in proper position endwise. When the vertical bead members 52 or 52a are omitted, the workman may loosen the slip plates 56 and merely slide the device forward without opening the plates 33, or lifting the device. Indicating notches or marks may be formed on the top flanges 4, when the bead members are removed.

The side plates 3 may be supplied without the horizontal bead 5, particularly for the use of the professional mason who does not rely upon the vertical spacing beads 52 or 52a for spacing the bricks apart endwise and does not rely upon the flange 5 for guiding the bricks by the lower outer edge of the same. He may guide the position and level of the bricks from the flanges 4, and their spacing by marks on the plates 3, such as notches filed on the flanges 14.

For the purpose of providing more mortar in the vertical joints where the vertical beads are used, the vertical bead members may, as shown at 52a in Figure 2e be shortened to approximately one-half the height of the plate 3 above the horizontal bead 5. This shortening of the vertical bead members allows the mortar in the vertical joint above the bead to come out flush against the face of the plate 3 and thereby there is enough mortar present for tooling the mortar into a rounded concave groove where that finish of the joint is desired. The bead members 52, 52 on one side plate 3 are offset by a distance equal to one-half of a brick length and vertical mortar joint relative to the bead members 52, 52 on the other side plate, so that a running bond, breaking joints between the inside row of bricks and the outside row of bricks in the wall construction is effected. As explained, some or all of the vertical bead members 52 may be removed and marks on the flanges 4 substituted.

Outside or slip plates 56 shorter in the vertical direction than the side plates 3 are clamped to the outside of the side plates 3 by bolts 57, 57 extending through slots 58, 58 in the said slip plates, and provided with wing nuts 59. The outside or slip plates 56 have upper flanges 60 adapted to underlie the flanges 4 on the side plates 3 when the slip plates are in raised position, as would normally be the case on a starter course on a flat slab or the like, and shorter lower flanges 62, which when the slip plates are in raised position extend to or preferably slightly below the lower edge of the inturned flanges 5 of the side plates 3, but not below the legs 7. The slip plates 56 when lowered below the flanges 5 of the side plates 3 close off the outer edge of the horizontal mortar bed, and hence define the outer edge of the mortar joint in each case where they are lowered.

When the device of Figure 1 is set upon a flat slab for the first or starter course of a wall, the forward end of the device is supported upon the rests 36, 36 at one end, and upon the lower ends 7 of the plate arms or upon said slip plate flanges 62, 62 at the rear end. The position of the flanges 62, 62 may be adjusted by means of the bolts and slots 57, 58 in order to level the device. That is to say, the slip plates may take part or all of the entire weight of the device and be employed as leveling devices where the slab is flat and substantially level. The eccentric cams 36a on the front rest member 36 may be used for leveling particularly on an uneven surface.

The vertical beads 52 space the bricks longitudinally to form the transverse vertical joints and the longitudinal vertical joint between the bricks is determined by the placing of the bricks with their outer exposed faces in engagement with the inner walls of the side plates 3, 3. It may now be observed that in the use of this device the bricks are aligned by the horizontal bead or flange 5 to have their lower outer longitudinal edges disposed in a horizontal line. In the usual manual practice of laying bricks, the bricks in a course are laid with their upper outer edges aligned, as by the use of the usual mason's line.

In the use of the device shown in Figure 1, the toggles and reaches are first adjusted for the desired thickness of wall which we may assume in the present instance is an 8 inch wall, using, for example, bricks which are 8″ x 3¾″ x 2¼″. This provides for a one-half inch vertical mortar joint between the inner faces of bricks in a course. The vertical bead members 52 which are ½″ wide are set 8 inches apart from edge to edge, so that an 8 inch brick may be fitted in between them, against the inside face of the plate.

For laying a starter course upon a slab or foundation wider than the wall to be erected, a guiding line may be made by snapping a chalk line along one or both edges of the wall to be erected. Then the device with the plates 3 in closed position, and with the slip plates 56 in raised position is set upon the foundation with the aligning lugs 7 registering with the chalk line at one or both sides. The device rests upon said lugs 7 at all four corners, and if the foundation is level, the spirit levels on the device will show it to be level. If the foundation is uneven, the slip plates 56 or the leveling cams 36a or a brick chip may be used to level the device. The aligning lugs 7 may then be kept upon the line or lines and the wall will be properly started.

If the foundation is of the same width as the wall to be laid, the slip plates 56 may be lowered, and the front end of the device leveled on the rests 36—36a, and the rear end blocked up in level position by a suitable wood block under the leveling rests 35. A pair of bricks laid by hand may be employed to support the rear end on said rests 35. A string laid chalk line on top of the foundation ⅝″ back from the edge may be used as a guide for the leveling knife 36, and a string laid chalk line on the side of the foundation about 1¼″ below the outer corner may be employed as a guide line for the vertical positioning of the slip plate flange 62. The same string lines may be employed to line up the wall every three or four courses or as often as desired.

With the device set in proper position on the foundation, a layer of mortar a little over one-half inch deep is then laid upon the foundation in the space between the side plates. For this purpose a scoop, such as shown in my copending application, Serial No. 139,876, filed January 21, 1950, is employed. The lower edges of the slip plates limit the outward flow of the mortar at the horizontal joint.

Proper alignment of the bricks being laid requires that the outer face of the brick shall engage flat against the inside wall of the brick plate 3, and where the flange 5 is used, that the lower outer corner of each brick shall rest upon the horizontal bead 5. This latter guidance is provided to secure proper horizontal alignment and vertical positioning. An alternative practice which the skilled workman may employ is to omit the bead 5 and locate the bricks solely by reference to the upper flanges 4 of the plates 3 thus modified. The alignment is then made with respect to the upper surface of the brick.

To ensure that contact of the brick with the face plate and of the lower outer edge of the brick on the upper edge of the flange or bead 5 is uniformly secured, it is in practice necessary to remove any mortar from the inside surface of the plate, and particularly at the junction of the bead 5 and the side plate 3. In other words, it is necessary to clean the mortar off of the side plate and off of the top of the bead. When the blades of the screed are made entirely of metal, and mortar deposits are difficult to reach with the blade, the end of the handle may be used. Removal may be effected by a separate stroke of a cleaning instrument, such, for example, as a windshield wiper blade. However, in the form of screed illustrated, I have provided flexible wiper edges on the sides and lower corners of the blade 65 of the screed, as shown in Figures 8 to 10. To serve this purpose, a piece 72 of rubberized woven fabric, such as rubber belting, is fastened at each side margin of mortar plate 65 by clamp plates 73 held by rivets 74, with the lateral edges of the belting material projecting about a quarter of an inch beyond the side edges of the screed blade 65. It serves as a flexible wiper blade. The piece of fabric 72 also projects below the lower edge 77 of the blade, and it has an inclined face 76 adapted to fit the upper surface of the horizontal bead 5 on the brick plate 3 to wipe it clear of mortar. An inclined edge 75 serves to sweep the mortar clear of the lower edge of the horizontal bead 5, but the edge 77 of the plate 65 lies above the lowermost point of the flexible wiper blade 72, so that in effect the wiper blade chamfers off the edge of the mortar bed as it wipes the brick plate and its horizontal bead. As the brick is located against the face of the plate 3 and tamped down to engage the bead 5, part of the mortar bed will be displaced into the groove to fill the same. Different size blades with wiper edges are to be employed for different settings of the width of the machine. Where, as later described, a hollow wall is to be constructed, the operator is provided with a screed having a blade which will enter the space provided on each side of the central filter, and this blade will have on one edge a flexible wiper of the character shown on each edge in Figure 8 to wipe one plate 3 and its bead 5 at a time. A screed with a plain mortar blade 65 that is without the flexible edges 72 may be employed as will later be described.

Mortar from the scoop 63 is deposited in substantially a level layer and the bed of mortar is then struck off by the screed shown in Figures 8 to 10, the lower blade 65 of which is set on cross bar 66 for the proper depth of the mortar bed. This blade 65 is known as the mortar blade and the short upper blade 67 is known as the brick blade. In using the screed, the cross bar 66 is rested at each side of the blade 65 upon the flanges 4, 4 and the lower blade 65 is employed to spread the mortar to the right depth. Thereupon the bricks are placed in contact with the faces of the side plates 3, 3, spaced by the vertical beads 52, and they are tamped down to the proper distance below the flanges 4, 4 of the side plates 3, 3 by means of the short or upper blade 67 of the said screed 64. The two blades 67 and 65 are separately adjustable by means of the bolts 68, 68 passing through slots 69, 69 in the upper blade 67 and like slots in the upper edge of the lower blade 65.

Where it is desired to erect a hollow wall, for example, a wall nominally ten inches thick with a two-inch space between the inner and outer courses, the device of my invention may be adjusted to the desired spacing, as indicated in Figures 5 and 6, with the central core or filler block member 82 shown separately in Figure 4 attached to the laying device as illustrated in Figures 5 and 6. It is evident that where the width of the bricks or other units may be greater or less than a standard brick, the thickness of the wall will vary. However, the machine being adjustable as to width may accommodate itself to the particular units being laid. The filler block fitting 82 comprises a rectangular channel shaped body 83 made of pressed and welded sheet metal open at the bottom and closed by suitable heads 84, 84 at the ends thereof. The open narrow side faces downwardly. The height of the filler block is optional, but preferably it is approximately equal to or slightly less than the depth of a course of bricks to be laid, so that this block projects down in register with the space between the bricks in a course previously laid far enough to prevent escape of mortar into the central opening of the hollow wall, and yet allow wall ties to pass under it. The transverse thickness of the filler block body 83 is preferably two inches for use in the United States, but it may be any dimension desired to establish the space between the inner and outer courses of bricks in the hollow wall. The body 83 and the ends 84 are made of sheet metal suitably formed and welded. Brackets 85, 85 of general T-shape have their stems 86 welded to the top or back wall of the body 83 and the head of the T-shaped body 87 has a pair of offset slots 88, 89 which are adapted to cooperate with the bolts 38 and 39, which clamp the channel shaped sections of the reach 15 together. The slots 88 and 89 are overlapped, and are of a suitable length, so that any reasonable adjustment for the width of the bricks or other units may be made. An additional pair of bolts 92 and 93 at each end may be passed through the slots 88 and 89 and through the corresponding slots 40 and 42 in the reaches, these slots being revealed by the separation of the channel members which constitute the reach. The filler block may be clamped to the reach by either or both pairs of bolts. When the filler block 82 is thus clamped to the bottom of the reaches 15, 15, and the device is in place, a bed of mortar is laid on each side of the filler block 82. Bricks are disposed in position against the inner faces of the side plates 3, 3, with their lower edges aligned by the bead flanges 5 on each of the plates, and a vertical edge of each disposed against the vertical bead members 52 or 52a. The vertical joints may be filled in as heretofore, and the device opened, as shown in Figure 6, for sliding the same forward to the next position.

Where it is desired to utilize wall ties, and space under the block is not available, suitable provision for them may be made by parallel saw cuts into the opposite sides of the vertical walls of the filler block 82 with a hack saw and bending inwardly the tongue thus formed between saw cuts. The wall ties may then be disposed in the slots with their ends disposed in the mortar upon the bricks at each side of the said block 82. Alternatively, the depth of the filler block 82 may be such as to allow wall ties to pass under the same.

After the bricks are placed in position on the bed of mortar, the right amount of mortar for filling the vertical joints may be measured out and deposited upon the bricks thus located, by means of a combined scoop and trowel, such as that disclosed in my copending application, Serial No. 139,876, filed January 21, 1950. If desired, the mortar may be worked and forced into the vertical joints by means of the mortar blade 65 of the screed.

When the mortar deposited upon the bricks thus placed in the device to fill the vertical joints is smoothed down and forced into the joints by means of the screed of Figure 8, the right depth of the bricks is assured by the use of the upper blade 67 as a gauge. Thereupon, the levers 46, 46 of the two toggles 16, 16 are raised to break the toggles and to separate the plates to open the device for releasing it from the bricks thus laid as shown in Figure 3 and the device is then advanced in the direction of the knife rests 36, 36, that is, to the right, as shown in Figure 1. The advance position is carefully registered longitudinally of the wall by means of the vertical beads 52, 52; the device is levelled, and the laying of the next group of bricks is a repetition of the group just described.

To assist the operator in aligning the bricks properly for a smooth right-angle corner, or for aligning any individual brick, I have provided the corner square shown in Figures 11 to 13. The corner square is shown in use in aligning the bricks at the end of a wall in Figure 14. Its use in aligning bricks laid in the corner of a wall is shown in conjunction with the guide device in Figure 20. This corner square comprises a plate 95 approximately 3 inches in width and of a length substantially equal to the thickness of the wall being laid, as for example 8 inches. A pair of plates 96 and 97 having angularly disposed base portions 96a and 97a, respectively, are disposed with their main body portions in a vertical plane at right angles to the horizontal plate 95, and upon opposite sides of the plate 95. The base portions 96a and 97a are of the same length as the plate 95 and overlap the margins of the plate 95 above and below and are welded to the said plate 95, whereby the main plates 96 and 97 which are of somewhat less length than the base portions 96a and 97a are in a common vertical plane at right angles to the plane of the plate 95. The base portions 96a and 97a extend for the full length of plate 95, but the vertical plates 96 and 97 are shorter in order to clear the beads 5 and 52 at each side of the device. When a corner is to be formed or an end of a wall is to be completed, the three-ply edge which includes the base portions 96a, 97a and the intervening plate 95 is laid upon the corner bricks previously laid, the plate 95 then being in horizontal position. The upwardly and downwardly extending plates 96 and 97 lie in a vertical plane tangent to the edge of the previously laid brick, such, for example, as 98 in Figure 14. The guide device shown in Figure 1 is moved sufficiently forward beyond the edge of the wall that the adjacent vertical bead on the outside of the corner does not interfere with the laying of the brick. The beads 5 of the side plates 3 rest upon the ends of the corner square. The lateral edge of the corner square 94 is pressed against the outside slip plate 56, for example, to the left in Figure 14, and thereby gives guidance for the laying of the brick 99 shown in dotted lines in Figure 14 with the side face of the brick guided by the side plate 3, and the end of the brick guided by the vertical plate 96, with both of said faces in vertical planes at right angles to each other. As soon as the corner or end brick 99, as shown in dotted lines in Figure 14, is thus guided and set in the horizontal mortar bed, the corner square may be withdrawn. Obviously, the companion brick in the case of the end of a wall may be similarly guided in place by the corner square and the companion side plate 3. Where a transverse tie brick is laid full length at the end of the course, it may likewise be guided by the corner square 94 and registered against one of the plates 3, as, for example, against the left hand plate 3 shown in Figure 14.

Where the corner square is to be used at the junction of two walls at right angles to each other which terminate in a corner, the outer brick which extends to the corner is carefully placed and aligned by means of the corner square and the adjacent side plate.

In Figure 20, I have shown the corner square 94 employed in laying a brick at the corner of a wall. The guide device has been advanced from the left of Figure 20 and is extended beyond the face of the abutting wall. The inner slip plate 56 has been raised and may rest upon the bricks extending toward or into the corner from the right. The outer slip plate 56 at the right is in its lowered position, or partly lowered to bear against the outside of the bricks in the wall immediately below the course being laid. The short thick three-ply edge is laid upon the brick below the corner brick 125 which it is desired to true up and lay. The lower vertical blade (not visible in Figure 20) lies flat against the exposed side face of the brick immediately below the brick 125, and the upper vertical blade 96 now serves as a guide for the end face of brick 125. The inner face of blade 96 lies in the vertical plane of the wall at the right of the corner, and lies at right angles to the side plate 3 at the left by virtue of the left hand edge of the square being pressed against said outer side plate. The extended end of the machine is supported and leveled by the corner square as the beads 5 of the side plates rest upon the projecting ends of the tongue of multiple thickness and the side plates are thereby held at the proper height for a ½" mortar joint. The brick 125 is thus guided into place, and is set upon the mortar bed, part of which is exposed at 126 at the left of the brick 125 and forward of brick 127. The brick to be laid upon the exposed mortar at 126 will be laid by hand, and it may likewise be guided by the corner square 94. The corner square is very useful in placing any brick which occupies a critical position as do bricks at or near a corner or wall end.

Where the guide device of my invention is to be employed to span a window or door opening, and the length of the span is greater than the length of the standard side plates, for example, in connection with guide devices having side plates 45 inches in length for laying eight bricks in an 8 inch wall, I provide means for connecting three guide devices in tandem. Two may be so connected if desired. In Figure 7 I have shown a triple unit adapter plate 100 for connecting in tandem three standard units. The three standard units 102, 103 and 104, which may, for example, have side plates 45 inches long, are so spaced lengthwise of the adapter plates 100 that the bricks guided in place by the three units constitute a single continuous running course with the adjustable vertical spacer bead members of either the long or short variety spaced on a pitch equal to the length of a brick plus the thickness of a vertical joint. To connect these three machines into the triple unit which will lay 28 bricks, for example, as against eight for each individual unit 102, 103 and 104, the slip plates 56 are first removed from the side plates 3 and the adapter plate 100, which is channel shaped in section with the web slightly convexed in the direction of the outwardly extending flanges similar to the slip plates 56 previously described, is bolted by means of the bolts 57 and slots 105 and 106 at each end of the adapter plate 100 to the two end guide devices 102 and 104. The bolts 57, 57, 57 of the central unit 103 are projected through holes in the central part of the adapter plate 100, and are fastened by the wing nuts with which these bolts are provided. The central unit 103 is thereby fixed in position, and the end units 102, 104 are adjustable. Adjustment can thus be made for the various sizes of bricks which may be employed in connection with the device. The end units 102 and 104 retain the toggle mechanisms 16, 16, since the unit is to be operated and handled by two men. The center unit 103, however, has the toggles removed therefrom, so that it merely follows the action of the toggles 16, 16. With this triple unit device, any ordinary door opening in a brick wall, including even a garage door opening, may readily be spanned in one operation. As is well understood by those skilled in the art, a lintel beam or plate or angle bars or the like may be utilized to support the first course of bricks spanning the opening. When the triple adapter plate is thus used, the short rests 35 will remain on the rearmost reach member, for example, the one at the extreme left in Figure 7, and the longer rest member 36 will be attached to the reach member at the extreme right in Figure 7, and the rest members of the intermediate reaches are removed as unnecessary.

In operation, the device above described and shown in Figure 7 is handled by two operators. It may be used in a straight run of wall of any selected thickness. The starter course is laid by the use of a single unit, and then the wall is continued by the use of the multiple unit.

Since, as in connection with the laying of ten or twelve inch walls the toggle lever 46 will not extend beyond the outer pivot 11 of the toggle link 45, and the operator may find it difficult to secure a hold upon the same when the toggle is straight, I provide a handle 110 as shown in Figures 5 and 6 attached at the front and ends of the toggle lever 46 and serving as a bail to permit the said toggle lever 46 to be raised more readily. Such a handle may be applied to the device shown in Figure 1 from which it has been omitted for the sake of clarity. The said handle 110 does not interfere with the adjustment of the pivot bracket 47 along the length of the toggle lever 46 as it loops over the same. The handle 110 is removably bolted on.

There are occasions when the mason may wish to lay a part of a course by hand, and part with the assistance of the guide device. Ordinarily, a mason will utilize a mason's string line to guide the upper outer corner of the bricks in a course. It is to be observed that with the preferred practice of the guiding device of my invention, the lower corners of the bricks being laid are registered with the top of the horizontal guiding flange 5, and this in turn is located by reference to bricks previously laid, that is, by the rear rests 35 which engage the bricks previously laid in the course under construction, and the forward rests 36 which engage bricks in the course underneath.

Now in order to lay the bricks with the guiding device of my invention, and yet be able to register the bricks with a mason's line, I provide the guiding device with a line registering attachment 120 on the side plates 3 or preferably with the line guide pointer 136 mounted on a nonmovable part, namely, the outer forward leveling knife 36 (Figures 17 and 18). The attachment 120 comprises an angular bracket having a vertical leg slotted to receive a pair of clamping screws that thread into the upper part of the plate arm 6 and clamp the device to said arm, and a horizontal finger 122, the outer end of which is brought to a point, see Figures 1 and 2, to constitute a pointer. The line registering attachment 120 is adjustable for height so that it may be used as an aid in the laying of bricks of various sizes.

In the use of the device 120 or 137 with the mason's line, the mason will first stretch the line in register with the upper corner of the bricks to be laid in a course. Then he may lay bricks by hand, registering them with that line. If he wishes to use the guide device, he inserts a pair of 2 x 4 blocks 130 (see Fig. 19) between the line and the wall, so that the line stands out from the wall by the distance which the line register point 122 or 137 stands out horizontally from the edge of the bricks in the course to be laid. In other words, the line is translated laterally, i. e., equally at each end away from the wall by a distance equal to the distance of the point of the finger 122 or 137 from the edge of a brick laid against the inside of the adjacent plate 3. For the device 120, this distance may be 1⅝", or for the line guide shown in Figures 17 and 18, a distance of 2".

The line registering attachment 120 is usually needed only on the two outside ends of the device, but may obviously be used on either side or both sides of the device.

The machine of my invention may be constructed with variations in detail. Also the workman may vary the use of the same according to his personal preference.

Thus the lower edge of the side plates 3 may be so constructed as to omit the inwardly extending bead or flange 5, in that case carrying the edge down to just short of the bottoms of the aligning lugs 7. Alternatively, an abbreviated width of flange 5 may be employed as above described. The side plate may thereby have an abbreviated shoulder adjacent its lower edge for locating the lower edge of the brick.

The machine has been employed without the use of leveling lugs 35 or knives 36 by resting the machine upon the brickwork by means of the horizontal beads 5. By the use of corresponding screed the mortar bed may be leveled off even with the corner of the bead 5 or at a higher level.

The machine in the preferred form, as herein described, is dependent upon leveling the bricks from the bottom corner on the horizontal beads 5. However, with the beads 5 removed or omitted, or disposed directly on the bricks below, the brick may be leveled from the top by reference to the flanges. Such modification of the machine and its mode of use it within the scope of my invention as defined in the appended claims.

In Figures 17 and 18, I have illustrated the leveling knives 36 at the front end as provided with a string gauge attached thereto. This string gauge comprises an angle bracket 132 made of strip stock and having one leg 133 shown in dotted lines in Figure 17, welded flat against the outside face of the leveling knife 36 and the other leg 134 extending outwardly beyond the end of the adjacent side plate 3. A pointer blade 135 having an acute angle point 136 is mounted on the leg 134 by means of a pair of screws lying in slots in the body of the blade 135. These screws clamp the blade 135 to the bracket arm 134 in the properly adjusted position. A similar pointer may be mounted on the leveling knife 36 on the other side of the device for use on the other side. The pointer 136 in each case extends beyond the end and side of the side plate 3, and provides a means for aligning the device with the mason's string line. In practice, if the forward end of the device is guided, and the device is kept level, the course will be straight and level.

The mason's string line is useful in keeping the wall straight, and the courses in alignment in and out and up and down. The block 130 for spacing the line 138 from the wall is shown in Figure 19. This consists of a 5" length of 2" x 4" wood cut to leave a vertical leg 139 which projects out 2" from the wall. It has a saw cut notch 140 to receive the string 138 on a level with the outer corner of the bricks to be laid in the course. This arrangement serves well where part of the course is laid by hand and the remainder is filled in by the use of the present device.

Before using the string gauge, place the guide device on a flat surface and adjust the pointers 136 on each side of the device to the height of one brick thickness plus one-half inch. This is accomplished by loosening the two adjusting screws 137 holding each pointer and moving the pointer to the proper height. Tightening the screws then locks the pointers in position. The string gauge is now set for the particular brick size and will not have to be changed, regardless of the joint thickness. The horizontal location of the pointer relative to the side plate does not change with brick sizes.

The string gauge is designed so that the guide device may be used in conjunction with ordinary hand work without resetting the string line. This arrangement is particularly desired where certain portions of the masonry are being laid by hand, and the guide device is used to fill in.

To use the guide device in this manner, place spacer blocks 130 shown in Figure 19 between the mason string line and the upper edge of the course, so that the line clears the wall by approximately two inches and the tip of the pointer 136 by 1/32". Having placed the guide device on the wall, rotate the leveling cam 36a nearest the mason string line 138 until the pointer 136 is level with the line. Then level the machine with the other cam 36a or a brick chip. Since the string line is offset two inches from the wall, the guide device can be opened and moved without disturbing the line. The string line gauges are provided only at the leading end of the guide device, none being needed at the rear end. When necessary, by loosening the wing nuts 57, 57 on the slip plates 56, the guide device can be shifted slightly from side to side to compensate for various corrections necessary to obtain a true wall with perfect alignment.

Laying bricks with the preferred form of the device of the present invention, i. e., utilizing the beads 5, differs from bricklaying as practiced by the mason, in the respect that the bottom of the brick is held in true alignment, whereas the mason aligns the top of the brick to a string line. However, as above explained, the mason's string line may be used, but does not alter the principle that the brick laid by this machine with the horizontal beads 5 is guided from the lower outer corner. Likewise, the method of mortaring the brick in all forms of the device is entirely different.

The present guide device provides for a solid uniform bed joint and fills the vertical and collar joints from the inside. The resultant exterior finish when beads 5 and bead members 52 are employed is a recessed joint. Flush exterior joints can be obtained by omitting the beads and bead members. The present device provides solidly filled joints and proper bonding of the brick in the mortar, making it possible to construct a better wall structurally and a wall that will be more waterproof.

While I have described the plates 3—3 as swinging in and out by angular motion for opening and closing the same, I may slide the plates toward and away from each other by a motion of translation within my invention as defined in the appended claims. A suitable mechanism for this is disclosed in my prior application.

Since the practice of laying bricks with the present guide device involves a completely new technique, a description of the purpose and mode of use of the device, and an explanation of the significance of certain of the parts is deemed desirable.

*The slip plates*

The slip plates 56 on each side of the machine can be raised and lowered by loosening the wing nuts 59 on each side. When both slip plates 56 are raised, the machine will rest on the four legs 7 which constitute the lower ends of the plate levers 6. These legs constitute aligning lugs. When the machine is placed on a flat surface or foundation with the slip plates in the raised position, it will be properly set for a one-half inch mortar bed joint and one course of brick thereupon. The foundation upon which the wall is to be built should be level, otherwise an excessive bed joint will result. The foundation should be checked for level, and then the first course of bricks should be started at the high point or high corner. The first course of bricks can be leveled by watching the spirit level L at the side of the machine. Cross level is maintained by reference to spirit levels T, T. Any irregularities in the foundation can be compensated for by leveling the machine by partially raising or lowering the slip plates 56 to hold the machine at proper height. Alignment of the wall longitudinally may be accomplished by snapping a chalk line on the foundation at the outside edge of the wall to be erected, and aligning the lugs 7, 7 on the chalk line.

In laying a corner, one slip plate 56 must be raised to clear the brick work of the abutting wall. This permits the machine to extend beyond the end of the corner and provides proper alignment for the corner brick. Also, it permits the corner square shown in Figure 11 to be used.

Both slip plates should be lowered after the first course of brick has been laid, so that the machine can properly align itself on the course. The slip plates touching each side of the wall properly align the machine for the vertical plane of the wall, and may be employed to secure vertical alignment of the course by reference to a chalk line on the outside of the wall a predetermined distance below the corner of the course just completed.

An important feature of the present invention is the use of the slip plates to close the outside edge of the horizontal mortar joint. The flange does not, in the preferred method of use of the device, rest upon the top surface of the bricks below it, and hence does not completely confine the outer edge of the mortar joint. That function is performed by the slip plates. This is particularly important where the beads 5 are shortened or omitted entirely.

Use of the leveling screed

The leveling screed, shown in Figures 8 to 10, may be provided with the flexible wiper edges, or these may be omitted and the blade 65 be a plain metal blade. The longer blade which extends down from the handle 66 permits the operator to smooth a level bed of mortar in the machine, and also to force the mortar into the vertical joints after the bricks are laid in the machine.

After the mortar for the bed joint has been dumped in the machine, the leveling screed is used by placing the handle 66 horizontally, so that it rests upon the flanges 44 of the side plates. It is then moved back and forth until the mortar is uniformly deposited in the machine. If the mortar is harsh, a chopping or zigzag motion to first spread it may be used. Mortar accumulations in spots where the mortar blade will not fit may be removed by using the long portion of the handle.

After the brick has been placed in the machine, they may be tamped to the right level with the short side of the screed to level the top of the brick. As the user becomes more proficient, this operation may be eliminated.

To fill the vertical joints in the brickwork, mortar is dumped on top of the brick positioned in the machine. With the leveling screed held at a flat angle of about 20° to 30° in relationship to the surface of the brick, the mortar is forced into the joints by moving the screed back and forth. After some mortar has worked into the vertical joint, the brick will tend to become locked into position. Considerable pressure can then be applied to the leveling screed, thereby forcing the mortar under pressure into the joint. A solid wall will result. Excess mortar is carried forward to the leading end of the machine, and used in the bed joint of the next machine setting.

Mortar joints

When the full length vertical bead members 52 are employed, a recess joint of ½" is formed. This is desirable where a raked joint is used, or for plaster applied directly to the brickwork, or where maximum speed is not necessary. For other than a raked joint, the recess will be filled with mortar and tooled to the joint desired. Ornamental mortar may be used for this filling.

To obtain a flush vertical joint, first adjust the machine for the brick size to be utilized. Mark this adjustment on the top flange 4 of the brick plates 3 by filing notches opposite the center of the vertical joints. Then remove all vertical beads in the machine by first removing the outside slip plates 56 and taking out the bolts 54. The slip plates may then be replaced. The removal of the vertical bead members will permit a flush vertical joint. The horizontal bead will still remain recessed.

To provide a flush horizontal joint, the width of the horizontal flange 5 on each plate 3 may be reduced as by cutting off a quarter inch strip from the edge by means of a hack saw. The joints after removal of the machine then have the appearance of brick laid by hand prior to rough cutting of the excess mortar with the trowel. The slight one-quarter inch inward projection of the remaining horizontal bead 5 prevents excessive extrusion of mortar along the bed joints. The result will be a clean face on both sides of the wall. If desired, one vertical bead, namely, the one located at the left end of the brick plate 3, namely, the one in the foreground in Figure 1, and containing the built-in spirit level, may be retained when the others are eliminated, as this helps position the machine when it is being set against previously laid brick.

The vertical beads and the large horizontal beads 5—5 are particularly useful for the amateur in properly positioning and leveling the brick to a horizontal line. As the operator becomes more proficient in the use of the machine, he can dispense with some of these aids.

It will be understood that the vertical bead members 52, and the horizontal beads 5, may be completely removed, particularly for use by the professional mason. Complete or partial removal of the controlling beads will help him to increase his speed appreciably.

Bed joint adjustment

On simple work, there is no reason for varying the thickness of the bed joints. The machine as furnished in the preferred form is set for a one-half inch joint, and may be so used in many types of brickwork without complication. In modern structures, it is often found that the bed joint must be varied to match the bottom of window sills, the heads or tops of windows and doors, or to match some architectural feature desired. Under prior practice, the mason accomplishes this by means of a story pole and the construction of leads or corners. Adjustment of the leveling knives at the forward end of the machine may be made for different thicknesses of mortar joints. The machine is preferably constructed initially with the beads or flanges 5 so disposed with respect to the adjusting lugs 7 that a one-half inch mortar joint will be formed, the leveling knives 36 at the front end being brought down flush with the ends of the adjusting lugs 7.

If a ⅜" joint is desired the leveling knives 36 should be adjusted so that they are ½" inch above the bottoms of the legs 7. If a ⅝" joint is desired, the length of the long leveling knives 36 is adjusted so that they protrude ⅛" below the bottom of the legs 7.

This adjustment may, of course, be made by means of the adjusting cams 36a.

Leveling the machine

Accurate work requires that the machine be level at each setting. The leading end of the machine, with the leveling knives 36, determines the accuracy of the work. If this end is kept level, the work will progress satisfactorily, because the other end of the machine will follow the movements of the leading end. The machine should be adjusted at each setting so that the built-in transverse spirit level T and the longitudinal level L at the forward end of the machine show the machine to be level. If the machine is not level, then first level the side plates 3 longitudinally by placing a wedge under the leveling knife 36, or rotate the corresponding cam 36a. Alternatively, the other end of the machine may be raised with a wedge or the like to bring the side plate level. Then the cross level, as indicated by spirit level T, is adjusted. This is accomplished by raising or lowering the opposite side by means of a wooden wedge or brick chip, or the cam 36a of the leveling knife.

When the machine is started at random on the wall, some means must be provided to support the rear end of the machine. This may be done by laying two bricks by hand to support the rear end of the machine. The amateur can obtain the same result by cutting a wooden block to fit under the short rests 35, 35 at the rear of the machine. This block should be equal to the height of one brick plus one joint.

*Suitable mortar consistency*

The usual mason's mortars work satisfactorily in the machine. It will accommodate all types of mortars ranging from Portland cement to hydrated lime. The machine will handle mortar somewhat wetter than the buttery trowel mortar of the mason, as well as over-sanded harsh mixes. The right consistency or degree of wetness can be best determined by the user of the device, since the character of the sand and mortar cement varies widely from place to place.

In the case of the mason who uses the machine jointly along with handwork, buttery mason's mortar should be used. Where the machine is used exclusively, or on large areas of the work, a less buttery mortar can be used to obtain greater speed and mortar economy. If excessive discloration of the face of the brick is noted, the mortar is too wet and should be reworked to a stiffer mix. The machine permits much wider lattitude in the consistencies of mortars than can be used with the trowel.

The use of my device in laying bricks or other masonry units permits an increase in the output of units laid by the skilled operator or alternatively reduces the effort required to lay a predetermined number of bricks. The great advantage, however, of the device of my invention is that unskilled or semi-skilled workmen, with the use of the device, are able to lay satisfactory walls expeditiously. A semi-skilled workman can lay between 2,000 and 3,000 bricks per day with the use of this device.

It is to be noted that the use of the machine serves not merely as a guide for the laying of bricks or like masonry units, but actually calls for a modification of the procedure of laying bricks. One of the most prominent features in this regard has to do with the vertical joints which by the use of the machine of my invention are better filled in and better bonded than is usually the case in hand laid walls. The mortar for the vertical joints may be wetter than has been the practice heretofore, since the mortar cannot escape out at the sides, and therefore may literally be cast in place. The same is true to a large extent of the horizontal mortar joint, although here the mortar must always be firm enough to provide support for the bricks laid upon the same and such incidental load as may be applied in the course of the operation, and it should not be so wet that it will run down and stain the bricks in the wall. However, the preferred procedure in the use of my invention utilizes a less stiff mortar and approximates the casting of the mortar in place.

As the mortar of greater water content (and hence not so stiff as is customary) is more easily workable and bonds to the surface of the units more readily, the physical effort involved in laying bricks or other masonry units is thereby reduced.

I do not intend to be limited to the details shown and described, except as they are required by the limitation of the appended claims.

I claim:

1. In a device for facilitating the laying of masonry units, a collapsible frame adapted in closed position to form a guide for laying the units and in open position to clear the laid units whereby the frame may be moved, said frame comprising a transverse horizontal reach, a pair of vertical plate arms having parallel flanges along the vertical edges of the upper ends thereof, said flanges embracing the ends of the reach and extending above the same, hinge pins pivotally connecting the ends of the reach with said flanges of the plate arms, the ends of said reach being trimmed above and below said hinge pins at less than a straight angle to each other to provide opened and closed position stops, toggle arms hinged together and having their outer ends hinged to the upper ends of said flanges and vertically disposed brick plates secured to said arms below the level of the reach, the toggle arms being adapted to be put under compression and the reach to be put under tension when the plates are moved to closed position.

2. In a device of the class described, a reach member comprising a channel shaped body portion and an end portion, said body portion comprising a horizontal web and integral vertical flanges along the side edges, a vertical clamping flange at the outer end of the web, said end portion comprising extensions of the side flanges beyond the clamping flange, said side flange extensions being of increased depth at their ends and having hinge pin holes for receiving hinge pins, the outer edges of said extensions adjacent said holes being vertical below said holes and being trimmed inwardly above said holes at an angle less than a straight angle to provide open and closed position stops.

3. In a device of the class described, a reach consisting of two reach members as defined in claim 2 having their channel shaped body portions nested and clamped together by a bolt and slot connection with the end portions extending in opposite directions.

4. The reach member of claim 2 in combination with a rest member comprising a vertical bar slotted to receive a clamping bolt and a bolt in said slot clamping the rest member to said clamping flange.

5. In a device of the class described, a transverse reach comprising a pair of relatively movable channel members nested and clamped together in a position of adjusted length of the reach, said channel members having slots therein, bolts passing through the slots in said channel members and clamping said channel members together, a pair of plate arms hinged to the ends of the channel members, the ends of said channel members presenting angularly related surfaces for engagement by said plate arms to define open and closed limits of movement of said plate arms, plates mounted on the lower ends of said arms, said arms extending above the ends of the channel members for hinged connection to a toggle, a toggle comprising a short channel shaped toggle arm hinged to one plate arm and a longer channel shaped toggle arm hinged to the other plate arm and overlying the first toggle arm, one of said toggle arms carrying a hinge pin and the other toggle arm being slotted, and a hinge clip hinged on said hinge pin and overlying said slot, and a bolt in said slot for clamping said clip to the slotted toggle arm.

6. In a device of the class described, a pair of plate arms, brick plates carried by the lower ends of said arms, pivot pins for a reach carried by said arms above the plates and pivot pins for a toggle carried at the upper ends of the arms, a transverse horizontal reach consisting of a pair of telescopically disposed reach members pivoted to said arms by the arm pivot pins, means for clamping said reach members together in fixed relation, a toggle comprising a lever and toggle link having the outer ends thereof pivoted to the upper ends of said arms by said toggle pivot pins, and a hinge bracket slidable along the lever and having pivotal connection with the inner end of the toggle link, and means for clamping said bracket fixedly to the lever.

7. In a device of the class described, a side plate having horizontal slots along its length, having an outwardly extending flange at its upper edge and an inwardly extending flange at its lower edge, and having vertical bead members disposed against the inner wall of said plate for spacing building units lengthwise of the plate, and bolts extending through said slots to said bead members to clamp the same adjustably to the plate.

8. In a device of the class described, a pair of side plates, plate actuating arms connected to said plates at each end of each plate, a reach pivoted to the arms at each end of the device, means for adjusting the length of each reach, a toggle connecting the arms at each end of the device, means for adjusting the length of each toggle, rest members adjustably connected to said reaches and constituting adjustable height gauges, vertical spacer beads disposed in spaced relation on the inner sides of the side plates, and means for clamping the beads to said side plates in adjustable position along the length of said side plates.

9. In a device of the class described, a first pair of side plates having two pairs of plate actuating arms, reaches between said arms and pivoted thereto, and toggles for actuating said arms to open and close said plates, a second pair of side plates having two pairs of plate arms, reaches between said arms and pivoted thereto, a third pair of side plates having two pairs of plate actuating arms, reaches between said arms and pivoted thereto and toggles for actuating said arms to open and close said plates, short rests for supporting the rear end of the device upon previously laid units in the course being laid, longer rests for supporting the forward end of the device upon units in the course previously laid, and a pair of adapter plates each extending along a corresponding side plate of said three pairs of side plates, means for clamping said adapter plates to the second pair of side plates, and means for clamping said adapter plates to the first and third pair of side plates, said last named means including slot and bolt connections for permitting longitudinal adjustment of the positions of said side plates at each end of the adapter plates lengthwise of the adapter plates.

10. In a device of the class described, a guide plate adapted to be disposed vertically along the side of a wall under construction to guide the positioning of masonry units being laid in a course, means for supporting said plate upon units previously laid in the wall, and an end guide having a horizontal plate adapted to rest upon the margin of a unit previously laid, and a pair of vertical plates lying in the same vertical plane one above and one below said horizontal plate, said horizontal plate having a lateral edge lying in a line at right angles to the common vertical plane of said vertical plates said lateral edge being brought into contact with the guide plate to establish the plane of the pair of vertical plates at right angles to the guide plate.

11. In a device of the class described, a pair of guide plates adapted to be disposed in parallel vertical planes, arms on said plates, reaches hingedly connected to pairs of said arms, toggles hingedly connected to the upper ends of pairs of said arms, a pair of rest members extending down from each reach adjacent the hinged connections of the reach to the plate arms, one pair of rests which is at the rear end of the device being relatively short, the other pair of rests being longer than the said one pair by substantially the height of a course of bricks including a horizontal mortar joint, said rests being adjustable as to height at their connections to said reaches.

12. The combination of claim 11 wherein the rests at the rear end of the device have the lower ends thereof rounded to facilitate dragging of the same over bricks laid in the course under construction, and cam means on the rests of the other pair for individually adjusting the effective height of said latter rests.

13. In a device of the class described, a pair of guide plates adapted to be disposed in parallel vertical planes, arms on said plates, reaches hingedly connected to pairs of said arms, toggles hingedly connected to the upper ends of pairs of said arms, a pair of rest members extending down from each reach adjacent the hinged connections to the plate arms, one pair of rests which is at the rear end of the device having the lower ends of the rests rounded to facilitate dragging of the same over bricks laid in the course under construction, the other pair of rests being longer than the said one pair by substantially the height of a course of bricks including a mortar joint, and means carried on said longer rests for individually adjusting the effective height of said rests.

14. A filler block comprising a channel shaped sheet metal body closed at the ends and open at the bottom, T-shaped lugs having the shanks thereof welded to the upwardly facing back of the channel shaped body and having the wings of said lugs slotted to receive clamping bolts.

15. A combination leveling knife and string gauge comprising a bar adapted to be vertically disposed, and having a bolt slot at its upper end, a horizontally disposed bracket having one leg attached to the bar at a point intermediate the ends of the bar, and the other leg extending in the direction of the axis of the bolt slot, and a pointer member mounted adjustably for height on said latter leg.

16. The combination of claim 15 wherein the lower end of said bar carries a rotatable cam for extending the effective length of said bar below the pointer member.

17. A combination leveling knife and string gauge comprising a flat bar adapted to be disposed vertically with one flat side facing outwardly and parallel to the outer face of a wall on which it is used, the upper end of the bar being slotted to receive a clamping bolt at right angles to its flat sides, a right angle bracket disposed in a horizontal plane having one leg fastened to the flat side and the other leg extending outwardly beyond the edge of the wall on which it is used, and a string gauge pointer carried on said latter leg at a distance above the lower end of the bar substantially equal to the vertical thickness of a brick plus a horizontal joint.

18. The device of claim 17 with an adjusting cam mounted on the lower end of the bar to extend the effective vertical distance between the lower end of the bar and the string gauge pointer to bring about an increase in the mortar joint at that point in the course being laid.

19. In combination for laying a corner brick in a course, a guide device comprising a pair of brick plates held in parallel spaced position to define the thickness of the wall course being laid, a slip plate extending down from the outer brick plate below the edge of the course previously laid, an end square having a horizontal plate of a length substantially equal to the thickness of the wall, flanges on said plate extending up and down in a vertical plane, the lateral edge of the plate being disposed at right angles to said vertical plane of said flanges, and being disposed against the surface of the outer slip plate to insure that the vertical plane of said flanges is at right angles to the plane of the brick plate, said flanges terminating short of the lower edges of the brick plates to provide space at each edge of the plate for engaging the lower edges of the brick plates, said plate having a tongue extending forwardly of said flanges and being adapted to rest upon the upper surface of the end of the course immediately below the course under construction, with the lower flange engaging the vertical end surface where the course under construction is to be terminated, the margins of said tongue portion at the sides of the upwardly extending flange extending under the lower edges of said brick plates and providing a support for the front end of said brick plates.

20. In a device of the class described, a pair of guide plates, an arm at each end of each plate, a pair of reaches hingedly connected between the registering arms at each end of said plates, a toggle hingedly connected between the upper ends of the registering arms at each end of said plates, each reach comprising a pair of overlapping reach members having a pair of bolts and a pair of slots for adjustment of the length of the reach, a filler block member having a pair of lugs at each end, said lugs having slots registering with the slot with said reach members and being adapted to receive the bolts which clamp the overlapping reach members together.

21. In a device of the class described, a pair of guide plates, plate arms connected to said plates and extending above the same, a longitudinally adjustable reach extending between said arms and having its ends hinged to said arms, and an operating toggle comprising a long arm and a short arm hinged at their outer ends to the plate arms, the short arm having its inner end hinged to the long arm at a point intermediate the ends of the long arm, the hinged connection of said long and short arms being adjustable longitudinally of said arms, said long arm overlying the short arm and constituting a lever for actuating the toggle, the toggle in said position acting as a strut between the outer ends of the plate arms to hold the plate arms in substantially parallel position, the ends of said reach being disposed at a right angle to the longitudinal axis of said reach below and being inclined inwardly above the hinged connections of said reach and said plate arms and cooperating with said plate arms to define respectively a closed position stop in which said plate arms are parallel and an open position stop in which said plate arms are inclined downwardly and outwardly of said reach.

PAUL H. SOMMERS.

References Cited in the file of this patent

UNITED STATES PATENTS

| Number | Name | Date |
| --- | --- | --- |
| 661,033 | Brownfield | Nov. 6, 1900 |
| 1,033,453 | Olson et al. | July 23, 1912 |
| 1,298,064 | Lichtenthaeler | Mar. 25, 1919 |
| 1,573,263 | Madden | Feb. 16, 1926 |
| 1,594,775 | Greslen | Aug. 3, 1926 |
| 1,736,812 | Youngblood | Nov. 26, 1929 |
| 1,833,582 | Kavanagh | Nov. 24, 1931 |
| 2,395,438 | Watkins | Feb. 26, 1946 |
| 2,428,374 | Malthouse | Oct. 7, 1947 |
| 2,437,485 | Sonnenschein | Mar. 9, 1948 |